Figure 1:
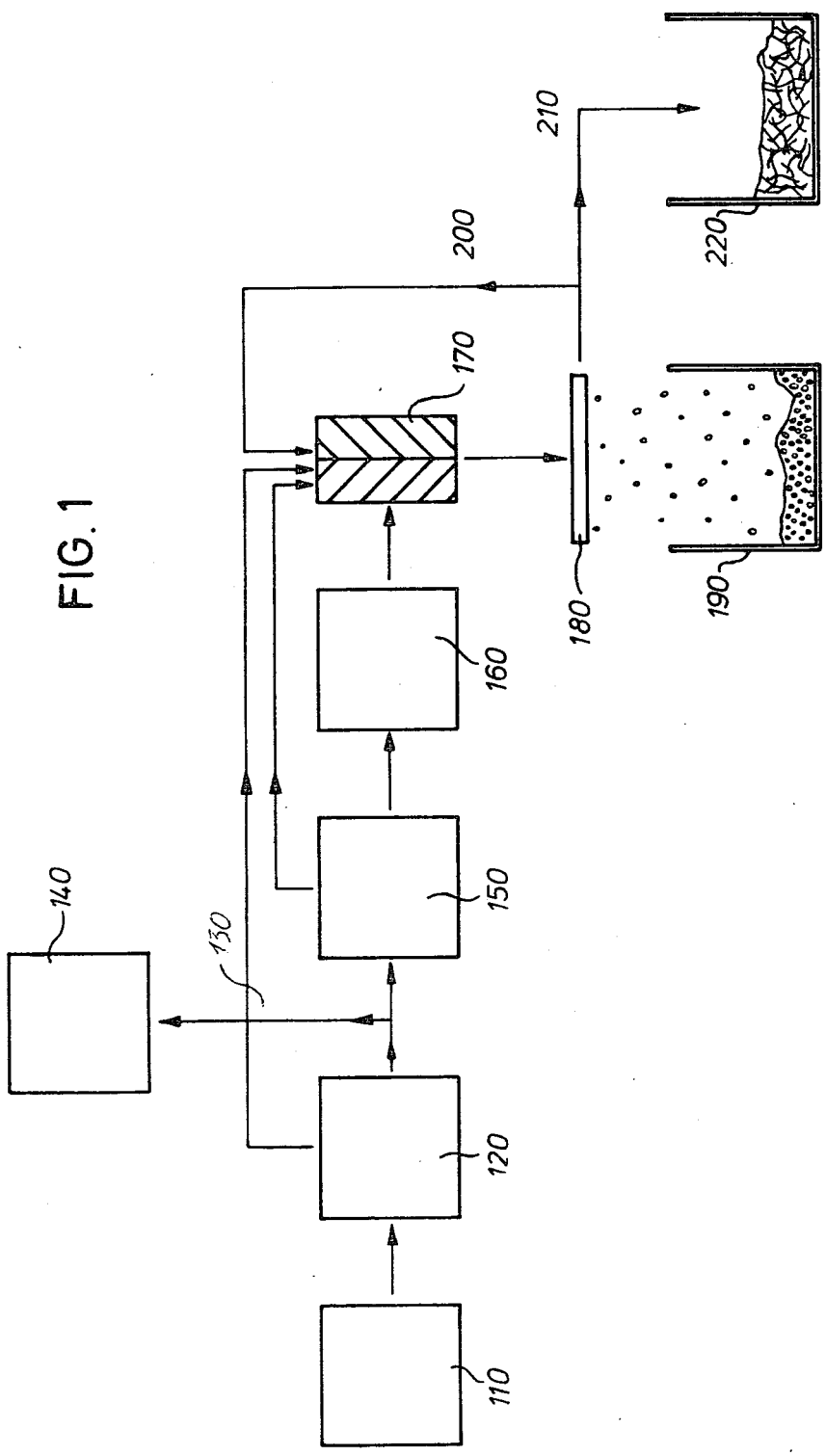

United States Patent [19]

Schmidt

[11] 4,363,450

[45] Dec. 14, 1982

[54] METHOD FOR MANUFACTURE OF RUBBER GRANULATE FROM OLD TIRES

[76] Inventor: Peter Schmidt, Seb.-Bach-Str. 6, 8264 Waldkraiburg, Fed. Rep. of Germany

[21] Appl. No.: 131,909

[22] Filed: Mar. 20, 1980

[30] Foreign Application Priority Data

Mar. 22, 1979 [DE] Fed. Rep. of Germany ....... 2911251

[51] Int. Cl.³ .............................................. B02C 19/12
[52] U.S. Cl. .................................... 241/24; 241/79.1; 241/101.4; 241/DIG. 31
[58] Field of Search ................... 241/DIG. 31, 14, 24, 241/101.4, 101.2, 79.1

[56] References Cited

U.S. PATENT DOCUMENTS

| 2,471,043 | 5/1949 | Schenck . |
| 3,364,526 | 1/1968 | Varady et al. ............. 241/DIG. 31 |
| 4,134,316 | 1/1979 | Bullinger . |

FOREIGN PATENT DOCUMENTS

| 256447 | 8/1967 | Austria . |
| 844320 | 11/1976 | Belgium . |
| 2305096 | 8/1974 | Fed. Rep. of Germany . |
| 2308244 | 8/1974 | Fed. Rep. of Germany . |
| 2302120 | 12/1974 | Fed. Rep. of Germany . |
| 2551272 | 12/1976 | Fed. Rep. of Germany ... 241/DIG. 31 |
| 2553539 | 5/1977 | Fed. Rep. of Germany . |
| 2629115 | 1/1978 | Fed. Rep. of Germany . |
| 1354217 | 1/1963 | France . |
| 52-54779 | 5/1977 | Japan ......................... 241/DIG. 31 |

*Primary Examiner*—Mark Rosenbaum
*Attorney, Agent, or Firm*—Fleit & Jacobson

[57] ABSTRACT

A method for the manufacture of rubber granulate from old tires in which the tire is in a first cutting operation cut into strips extending along its perimeter and the bead strips which contain steel elements are rejected. In a second cutting operation, which is in a direction oblique to the first cutting operation at least the strips which extend substantially in the direction of the tire perimeter and contain textile fibres are cut through. Following the rubber portion is separated from the fabric in a crushing mill and finally the pieces are sorted according to the size. An apparatus for carrying out the method comprises a longitudinally cutting device with cutting edges extending in the direction of conveying of the tire and downstream thereof a transversely cutting device having cutting edges extending at right angles to the direction of conveying. The apparatus further comprises a crushing mill for tearing the cut pieces and sieving and sorting devices, all the devices being interconnected by conveyors.

24 Claims, 4 Drawing Figures

METHOD FOR MANUFACTURE OF RUBBER GRANULATE FROM OLD TIRES

The invention relates to a method for the manufacture of rubber granulate from old tires, in which the tire is pre-disintegrated into pieces in two subsequent steps, the pieces are torn by stretching and the carcass fabric, steel or textile cord is rejected.

The invention also relates to a device for carrying out the method.

Such a method is known from German Pat. No. 2,427,070, which in itself is a modification of a method described in U.S. Pat. No. 2,471,043.

In view of the continuous development of tires from a rubber tire with a textile ply to tires which are presently predominently available on the market and have a bead with a steel wire insert and the carcass of which is partly or fully composed of steel cord, it was necessary to adapt also the method of disintegration of old tires to obtain suitable rubber pieces, free of other material, for further use of old rubber.

The task of the present invention is therefore to devise a method which is suitable for the treatment both of tires with textile and old tires having a steel bead, steel fabric ply and a steel belt while avoiding the expenses on machinery, considered presently as necessary, to produce rubber granulates without fabric portions, i.e. without textile and without steel particles.

This is according to the invention achieved in that (1) the tire is in a first cutting operation cut into a plurality of strips extending along its perimeter that (2) the bead strips which contain steel elements are rejected, that (3) at least the strips which extend substantially in the direction of the tyre perimeter and contain textile fibres are in a second cutting operation cut through in a direction which is oblique to the first cutting, that (4) in all cut-up tires pieces rubber is separated from the fabric in a crushing mill, and finally (5) the pieces are sorted according to the size in a sieving operation, while, if necessary, the steps (4) and (5) are repeated in a cycle until the desired size of the pieces is obtained.

The method according to the invention takes into consideration primarily the construction of radial tires having steel bracing belts, which today dominate the market. It is based on the principle that by suitable guiding of the cutting operations first only pieces should be made from the old tires the length of which corresponds to that of the steel components embedded in the rubber, and remains below a desired length. In view of the aimed at guiding of the cut according to the invention, namely approximately along and transversely to the direction of the steel fabric plies in the tire and the steel bracing belts, this desired maximum cutting length is ensured so that pieces of old rubber of approximately uniform size are brought to the crushing mill. In comparison with disintegration by means of chopping and tearing tools in which the tires are disintegrated into old rubber pieces of arbitrary size, there is the further advantage of energy saving because chopping and tearing machines need much more energy than cutting machines. Due to the inventive guiding of the cut the bead is rejected in the form of a continuous marginal strip before further treatment, without requiring magnetic separation in a separate and parallel working operation. Because the method according to the invention ensures unity of composition of the pieces of old tires there is little danger of damage to the crushing mill. Moreover the mill may be selected according to the now defined properties of the disintegrated material. In view of the tearing and sorting operation which may be, if necessary, made in cycle, expensive intermediate selection stages, used in known methods, may be avoided. The size of the granulate may be determined according to the mesh aperture size of the sieve in the cycle of the crushing mill. The textile fabric and steel fabric parts are separated on passing through the crushing mill as loose free fibres and threads from the rubber granulate. These textile and steel fibres and threads may be rejected after sieving and this is achieved preferably mechanically, pneumatically and/or magnetically.

According to a further advantageous variant of the method according to the invention also the first cutting operation in the circumferential direction of the tire is subdivided into two subsequent cutting steps. In the first cutting step are from the old tire, the sidewall parts of which are preferably pressed on to each other, made approximately uniformly wide strips of a length corresponding to the circumference of the tire. In view of the guiding of the cut the fabric fibres in the strips cut from the tire sidewall approximately perpendicularly to the cutting edges and their length consequently is approximately the same as the width of these cut strips. The tread part of the carcass is usually built up from a plurality of approximately mutually diagonally extending cord plies from textile material or steel and has between the tread and the described structure belts the threads (wire or textile) of which are approximately parallel to each other in the circumferential direction. In view of the cut guiding according to the invention in the second cutting step rubber strips with fabric threads are therefore obtained the length of which, due to the diagonal positioning of the fabric threads, is only slightly greater than the width of the cut strips and fabric threads which lie in the longitudinal direction of the strips and may have a length which corresponds at the most approximately to the circumference of the tire. These steel wires are in the second cutting operation cut also into pieces of uniform length. The second cutting operation may preferably be so performed that it is harmonized with the width of the strips obtained in the first cutting operation, and the length of the strip pieces obtained in the second cutting operation corresponds to the width of the strips obtained in the first cutting operation.

The apparatus, to which the invention also relates, for carrying out a method according to the invention has a cutting device for cutting old tires into pieces, a crushing mill for tearing the cut pieces and a sieving and sorting device, all the devices being interconnected by conveyor means. The apparatus according to the invention is characterized in that the cutting device comprises a longitudinally cutting device with cutting edges extending in the direction of conveying of the tire and, downstream thereof in the direction of conveying is situated a transversely cutting device having cutting edges extending at right angles to the direction of conveying.

Figure 2:
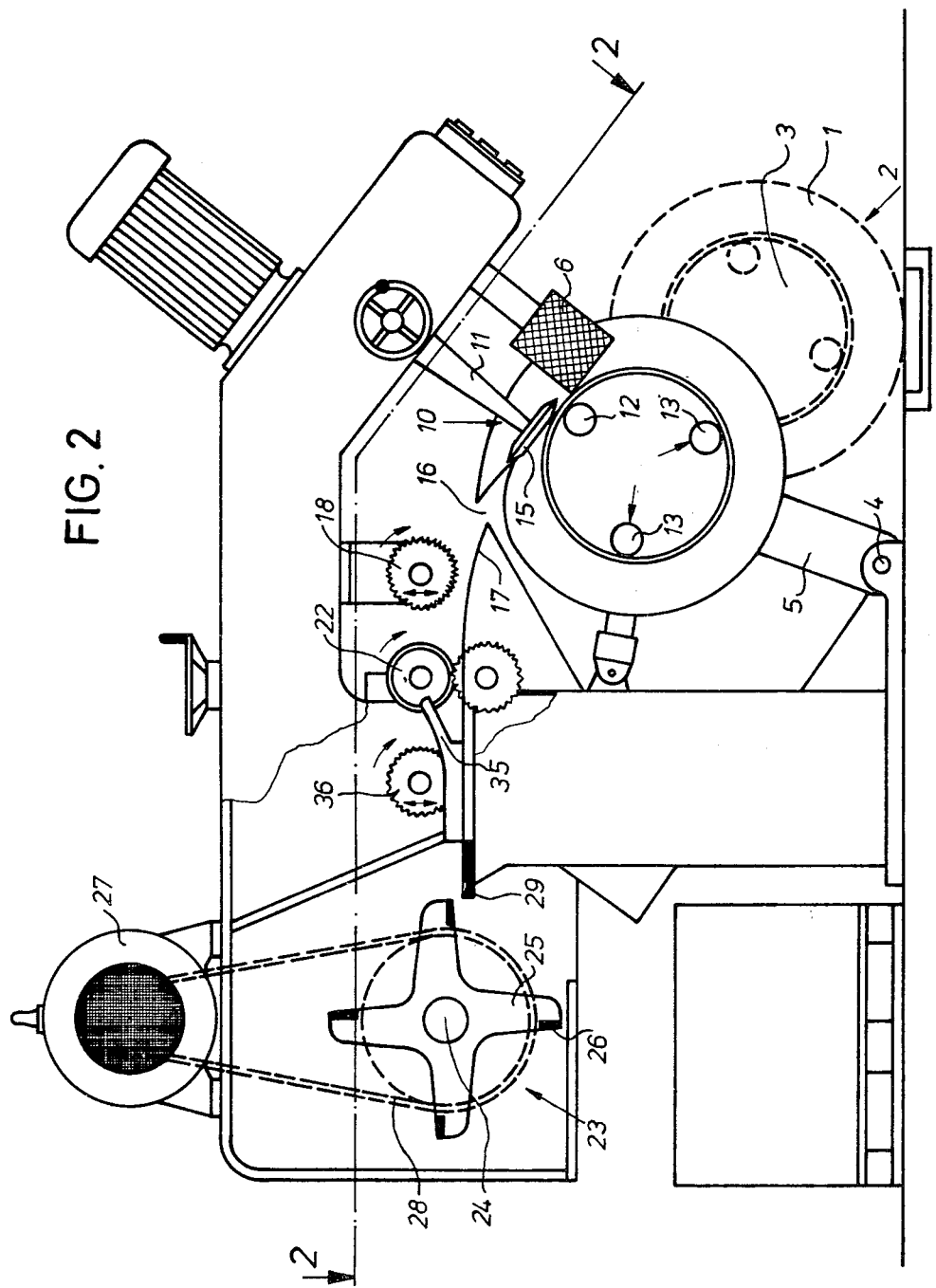
Figure 3:
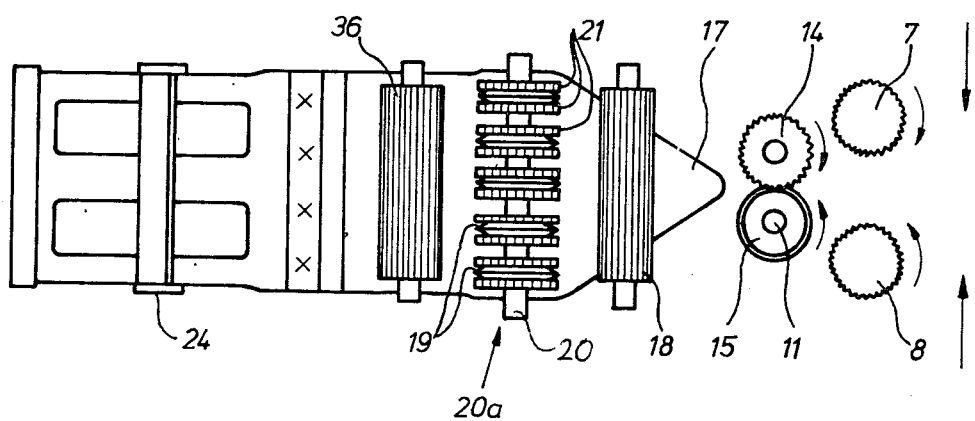
Figure 4:
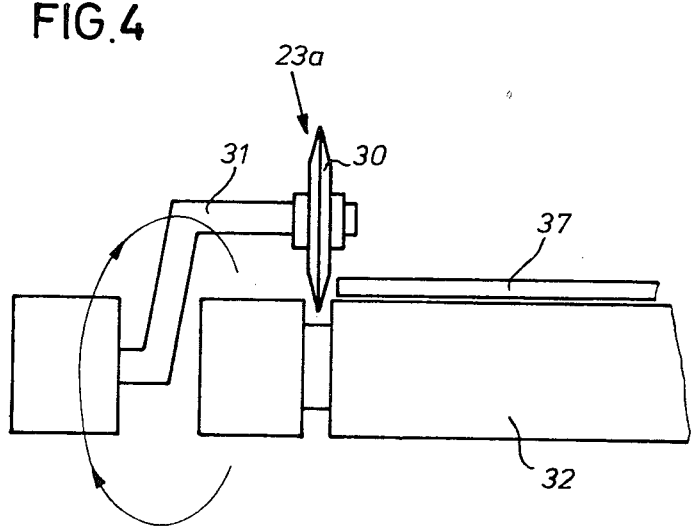

The invention will now be described in detail with reference to the accompanying drawings, in which:

FIG. 1 is a block diagram showing operational steps of a method according to the invention, FIG. 2 is a side view of a cutting device, FIG. 3 is a section along line 2—2 in FIG. 2, and FIG. 4 is a further embodiment of a knife head used in the second cutting operation.

It can be easily seen from the block diagram in FIG. 1 of the method that the method according to the invention is much simpler than methods which have been used. Intermediate sorting operations and the return of a separately treated material component into the working process before the tearing means are completely absent. The process flow in the method according to the invention is apparent from the subsequent steps explained below, which are in FIG. 1 indicated by corresponding references. Old tires are fed at 110 into a disintegrator while the mutually opposite sidewall parts of the tire are pressed against each other. In a first cutting stage 120 the marginal strip which contains the steel packet of the tire bead is so cut off in the circumferential direction that its rubber component is as small as possible. From the tire sidewall part may be simultaneously cut about 5 cm wide strips which may be directly supplied to a crushing mill 170. The bead strip is rejected via a conveyor path 130, 140 and discarded. The tangentially cut tire proceeds to station 150. On this occasion the sidewall parts may be approximately in the plane of the carcass spread and cut together with it into strips of equal width extending parallel to the circumferential direction. The strips from the sidewall of the tire may be fed from here directly to the crushing mill 170. In the station 160 are cut in a second cutting operation preferably the strips of the tread part transversely to the longitudinal axis. To the crushing mill 170 are then supplied the old rubber pieces with textile and steel fabric plies the width and length of which depend on the spacing of the knives in the stations 120 and 150 and their length depends on the speed of conveying of the strips and on the speed of cutting in the station 160.

The rubber parts are disintegrated in the crushing mill 170 by stretching up to the breaking limit in a manner known per se, the rubber components are separated from the fabric ply and both are together fed to the sieving device 180. Parts of the desired size fall through the sieve 180 into a container 190, while larger parts travel on the conveyor 200 back to the crushing mill 170. This process may be repeated as required until all parts are smaller than the mesh aperture size of the sieve 180. The fabric component is then rejected along the conveyor 210, e.g. by means of a magnetic drum and a cord separator at 220.

In FIG. 2, which is a side elevation of an apparatus for carrying out the cutting operation, are shown devices for the steps taking place at 110, 120, 150 and 160.

An old tire 1 is at 2 positioned on to a holder 3 having a stationary roller 12 and two displaceable rollers 13 and is lifted by means of a lifting device, here in the form of a swingable arm 5 on a pivot 4, and is delivered to a pressing tool 6. This pressing tool 6 consists of two rollers 7, 8 rotatable in opposite direction, which press the mutually opposite sidewall parts of the old tire 1 flatly against each other so that they form an approximately annular double surface before they are delivered to the first cutter 10. This cutter 10 consists in the illustrated embodiment of a circular knife 15 on a shaft 11 which is at an angle to horizontal and, when the arm 5 is lifted, is at a predetermined distance from the stationary roller 12. The cutting edge of the circular knife 15 presses the flatly compressed sidewall ring against a transport roller 14 which rotates in opposite direction. The circular knife 15 cuts the tire 1 first of all tangentially. The circular knife 15 is so adjusted that its cutting curve runs in close proximity to the bead, to cut off from the tire 1 a narrow marginal strip including the bead. The bead can then be rejected without any significant loss of rubber material.

The tire 1 has at 16 a still slightly curved surface and runs on to a shoulder 17 which is slightly curved in the upward direction, where it is caught by a transport roller 18 which conveys it to a second cutter 20a which is composed of spaced-apart circular knives 19 arranged on a shaft 20, the cutting edges lie between and below transport rollers 21. The flat tire 1 is pressed, by a pressing roller 22 rotating in opposite direction, against transport roller 21 and against the cutting edges of the circular knives 19. The tire is here cut into strips of a width which corresponds to the spacing of the circular knives 19 on the shaft 20. The individual plies of the carcass formed by fabric threads extending diagonally to the circumferential direction, are cut through along a cutting curve which is at an angle to the extension of the carcass, so that the length of the obtained fabric threads is somewhat greater than the width of the cut strips. The bracing belts which form one or more layers extending parallel to the circumferential direction and are situated between the tread and the carcass are cut along cutting curves extending into circumferential direction into more or less long threads. The maximum length of these threads could theoretically correspond to the circumferential size.

The cut strips arrive at a guiding channel 35 and are conveyed by a conveyor roller 36 to the cutting device 23 situated downstream of the strip cutters 10 and 20. The purpose of this cutting device is to cut the strips into pieces by a knife 25 which has four cutting edges 26 and is mounted on a shaft 24 extending transversely to the direction of conveying of the tire strips. When the shaft 24 is driven by the motor 27 and transmission 28 each cutting edge 26 cuts in a scissor-like manner all the strips fed to the cutting device 23 by means of a cooperating cutting edge 29, transversely to the direction of conveying, into individual pieces. The length of these pieces is determined by the selection of the speed of rotation of the knives and may be varied. The wires of the steel belt, which lie in the supplied rubber strips in longitudinal direction, are now by means of the cutting device 23 cut into preferably about 5 cm long pieces so that the crushing mill (not shown) situated downstream thereof is supplied with pieces of rubber in which all the textile and steel fabric components have an identical length of about 5 cm.

FIG. 4 shows a further embodiment 23a of the cutting device 23 in the form of a circular knife 30. This circular knife 30 is carried by a shaft 31. Its cutting edge lies in a rotatable groove on the surface of a shaft 32. The shaft 31 revolves in a circular path about the strips 37 arriving from the cutting device 20a on to the shaft 32, so that the circular knife 30 performs the desired cuts extending transversely to the length of the strips. The approximately square-shaped pieces of rubber formed thereby are finally fed to a crushing mill (not shown), designed in a manner known per se, in which they are made into granulate.

I claim:

1. A method for the manufacture of rubber granulate from tires of the type having a bead with a steel wire insert and a carcass comprised of rubber and steel cord, in which the tire is disintegrated into pieces in sequential cutting operations, the pieces are torn by stretching, and the rubber is separated from the steel wire of the carcass, said method comprising:

pressing side-wall parts of the tire against each other;

removing a marginal strip from the tire containing the bead and steel wire insert;

cutting the remaining portion of the tire in a first cutting operation into strips extending along its perimeter;

rejecting bead strips which contain a steel cord;

cutting through at least strips which extend substantially in the direction of the tire perimeter and contain textile fibres in a second cutting operation in a direction which is oblique to the direction of cutting during the first cutting operation;

separating from all cut up tire pieces of the carcass the rubber portion in a crushing mill; and sorting the pieces according to size in a sieving operation.

2. A method according to claim 1 characterized in that separating includes subjecting cut up pieces to a mechanical force.

3. A method according to claim 1 characterized in that the second cutting operation (160) takes place obliquely to the periphery of the tire, is performed by means of a rotating knife, the path of the knife head corresponding substantially to a circular path which extends obliquely to the direction of conveying of the strip and extends around the strips, and that the cutting operation is directed radially inwardly.

4. A method according to claim 3 characterized in that the second cutting operation is adjusted to the width of the strips obtained in the first cutting operation and is so performed that the length of the strip pieces made in the second cutting operation corresponds approximately to the width of the strips obtained in the first cutting operation.

5. A method according to claim 3 characterized in that the rotational speed of the knife guided along a path which runs about the strips is selected according to the speed of conveying in such a way that the length of path of the strip during one turn of the knife corresponds to the desired length of the strip.

6. A method according to claim 1 characterized in that the strips are cut into pieces in a scissor-like manner obliquely to the direction of their conveying.

7. A method according to claim 1 characterized in that strips which are about 5 cm wide are cut in the first cutting operation.

8. A method according to claim 1 or 7 characterized in that in the second cutting operation the strips are cut into pieces which are about 5 cm long.

9. A method according to claim 1 characterized in that separating includes subjecting cut up pieces to a pneumatic force.

10. A method according to claim 1 characterized in that separating includes subjecting cut up pieces to a magnetic force.

11. An apparatus for manufacturing rubber granulate from tires of the type having a bead with a steel wire insert and a carcass comprised of rubber and steel cord, said apparatus comprising:

means for pressing side-wall parts of a tire against each other;

means for cutting a marginal strip from the tire containing the bead and steel wire insert;

a cutting device for cutting the tire into pieces;

a crushing mill for tearing the cut pieces;

sieving and sorting devices for processing the cut pieces; and conveyor means for conveying the tire and cut pieces in a conveying direction from the cutting device, to the crushing mill, and to the sieving and sorting devices, the cutting device comprising a first cutting device with cutting edges extending in the direction of conveying of the tire for cutting longitudinally-extending strips, and downstream thereof a second cutting device having cutting edges extending at right angles to the direction of conveying for transversely cutting the longitudinally-extending strips.

12. An apparatus according to claim 11 characterized in that the first cutting device comprises a shaft extending transversely to the direction of conveying, a plurality of circular knives arranged with spacing on the shaft, and idling rollers arranged between the circular knives, the width of the idling rollers corresponds to distances between the individual circular knives, and conveyor rollers for pressing the tire onto the idling rollers.

13. An apparatus according to claim 12 characterized in that the means for cutting includes a laterally arranged cutting head which is situated upstream of the circular knives, and a shaft for the cutting head which extends at an angle relative to the shaft carrying the circular knives, the cutting direction of the cutting head extending tangentially in the peripheral direction of the side portions of the tire.

14. An apparatus according to claim 13, characterized in that the second cutting device includes a knife head, a shaft extending transversely to the direction of conveying of the tires for supporting the knife head, the knife head having a plurality of first cutting edges which extend parallel to the shaft of the knife head, and cooperate in a shear-like manner with stationary second cutting edges which also extend parallel to the shaft.

15. An apparatus according to claim 11 characterized in that said second cutting device has a knife head guided on a path which runs around the tyre profile and extends transversely to the tread part, the cutting edge of which is directed radially inwardly.

16. An apparatus according to claim 11 characterized in that the cutting devices are circular knives.

17. A method for the continuous manufacture of rubber pieces from tires having carcasses and beads containing steel packets, in which a tyre is disintegrated and beads are separated from a rubber part of the carcass of the tire, the beads are rejected, and the rubber part of the tyre is disintegrated, said method comprising:

pressing side walls of a tire to each other and removing the beads containing the steel packet in an initial operation;

cutting and dividing said rubber part of the tire into strips along its perimeter in a first cutting operation;

rejecting said beads containing said steel packets; and cutting through at least said strips which extend substantially in the direction of the tire perimeter and contain textile fibres in a second cutting operation in a direction which is oblique to the first cutting direction.

18. A method according to claim 17, further comprising:

positioning a tire to be disintegrated in a rotary holder;

rotating the holder to bring the tire to a first cutting device for performing the first cutting operation and having at least one circular knife rotating in one direction and a conveyor roller pressing against the knife and rotating in the opposite direction.

19. An apparatus for the continuous manufacture of rubber pieces from tires of the type having a carcass comprised of rubber and other materials and peripheral beads containing steel packets, said apparatus comprising:

means for conveying a tire and its pieces in a predetermined conveying direction;

first cutting means for cutting the tire into pieces and having a plurality of cutting edges extending in the direction of conveying of the tire for cutting longitudinally-extending strips;

second cutting means downstream, in the conveying direction, of said first cutting means and having cutting edges extending at right angles to the direction of conveying for transversely cutting the longitudinally-extending strips;

a rotary holder for the tire arranged upstream, in the conveying direction, of said first cutting means and including rollers for holding said tire in a circle; and cutter means having a cutting edge directed approximately tangentially to said circle for cutting the tire on said rotary holder along a perimeter of said beads of said tire and for separating said beads from the rubber part of said tire.

20. An apparatus according to claim 19 characterized in that said cutter means includes at least one circular knife rotating in one direction and a conveyor roller pressing against said knife and rotating in the opposite direction, said tire being held on said rotary holder and being movable between said circular knife and conveyor rollers while rotating on said holder.

21. An apparatus according to claim 19, further comprising a pressing tool comprising two rollers rotating in opposite directions arranged upstream of said first cutting means for pressing side wall parts of said tire to each other, said tire being held on said rotary holder.

22. An apparatus according to claim 19 characterized in that the first cutting means comprises a shaft extending transversely to the direction of conveying, a plurality of circular knives arranged with spacing on the shaft, and idling rollers arranged between the circular knives, the width of the idling rollers corresponding to distances between the individual circular knives, and conveyor rollers for pressing the tyre onto the idling rollers.

23. An apparatus according to claim 19 or 22, characterized in that the second cutting means includes a knife head, a shaft extending transversely to the direction of conveying of the tires for supporting the knife head, and stationary second cutting edges, the knife head having a plurality of first cutting edges which extend parallel to the shaft of the knife head, and cooperate in a shear-like manner with the stationary second cutting edges which also extend parallel to the shaft.

24. An apparatus according to claim 19, wherein said second cutting means includes at least one circular knife having a plurality of cutting edges guided on a path which runs around the longitudinally-extending strips of the tire and extends transversely to the conveying direction of said strips, and oppositely arranged shaft rollers having grooves, cutting edges of said circular knife being directed radially into said grooves of said shaft rollers.

* * * * *